(12) United States Patent
Saeed

(10) Patent No.: US 8,621,437 B2
(45) Date of Patent: Dec. 31, 2013

(54) WEIGHTED PERFORMANCE METRICS FOR FINANCIAL SOFTWARE

(75) Inventor: Umair Saeed, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 1148 days.

(21) Appl. No.: 12/113,399

(22) Filed: May 1, 2008

(65) Prior Publication Data

US 2009/0276761 A1 Nov. 5, 2009

(51) Int. Cl.
*G06F 9/44* (2006.01)

(52) U.S. Cl.
USPC .......................................... 717/127; 717/151

(58) Field of Classification Search
USPC ........................ 717/120–123, 168
See application file for complete search history.

(56) References Cited

U.S. PATENT DOCUMENTS

| | | | | |
|---|---|---|---|---|
| 5,812,780 | A * | 9/1998 | Chen et al. | 709/224 |
| 7,464,161 | B2 * | 12/2008 | Chagoly et al. | 709/224 |
| 8,006,230 | B2 * | 8/2011 | Agarwal et al. | 717/120 |
| 2003/0037324 | A1 * | 2/2003 | Kong et al. | 717/173 |
| 2004/0015954 | A1 * | 1/2004 | Tuerke et al. | 717/173 |
| 2006/0112388 | A1 * | 5/2006 | Taniguchi et al. | 718/100 |
| 2006/0129892 | A1 * | 6/2006 | Diaconu et al. | 714/38 |
| 2006/0241961 | A1 * | 10/2006 | Tsyganskiy et al. | 705/1 |
| 2008/0098348 | A1 * | 4/2008 | Olson et al. | 717/104 |
| 2009/0024992 | A1 * | 1/2009 | Kulaga et al. | 717/177 |

OTHER PUBLICATIONS

Larry Best,What is Architectural Software Development, 1995,.*
John D. Gould and Clayton Lewis, Designing for Usability: Key Principles and What designers Think, Communications of the ACM, Mar. 1985, vol. 28, No. 3, p. 300-311.*
ZhenJiang, JiangSu, Content computing: Advanced Workshop on Content Computing, AWCC 2004,China, Nov. 15-17, 2004, p. 357.*
Marty Poniatowski, William F. Evans , HP-UX virtual partitions, Prentice Hall Professional, 2002—Computers—628 pages, p. 209.*
An Architecture-Based Approach to Self-Adaptive Software by Peyman Oreizy, Michael M. Gorlick, Richard N. Taylor, Dennis Heimbigner, Gregory Johnson, Nenad Medvidovic, Alex Quilici, David S. Rosenblum, and Alexander L. Wolf (hereafter Oreizy), 1094-7167/99, 1999, IEEE Intelligent Systems, p. 54-62.*
"Automatic Performance Management in Component Based Software Systems" by Ada Diaconescu, Adrian Mos, and John Murphy (hereafter Diaconescu), Performance Engineering Laboratory, Dublin City University, Proceedings of the International Conference on Autonomic Computing (ICAC'04).*

* cited by examiner

*Primary Examiner* — Lewis A Bullock, Jr.
*Assistant Examiner* — Hau H Hoang
(74) *Attorney, Agent, or Firm* — Park, Vaughan, Fleming & Dowler LLP; Steven E. Stupp

(57) ABSTRACT

Embodiments of a computer system that determines a performance metric are described. During operation, the computer system determines the performance metric for tasks performed by financial software during a time interval. This performance metric is based on a weighted summation of contributions from the tasks, and a given weight associated with a given task is based on a frequency of occurrence of the given task. Then, the computer system performs a remedial action to improve the determined performance metric during a subsequent time interval.

12 Claims, 4 Drawing Sheets

⎯ 300

DETERMINE A PERFORMANCE METRIC FOR TASKS PERFORMED BY FINANCIAL SOFTWARE DURING A TIME INTERVAL, WHERE THE PERFORMANCE METRIC IS BASED ON A WEIGHTED SUMMATION OF CONTRIBUTIONS FROM THE TASKS, AND WHERE A GIVEN WEIGHT ASSOCIATED WITH A GIVEN TASK IS BASED ON A FREQUENCY OF OCCURRENCE OF THE GIVEN TASK
310

PERFORM A REMEDIAL ACTION TO IMPROVE THE DETERMINED PERFORMANCE METRIC DURING A SUBSEQUENT TIME INTERVAL
312

─ 300 

DETERMINE A PERFORMANCE METRIC FOR TASKS PERFORMED BY FINANCIAL SOFTWARE DURING A TIME INTERVAL, WHERE THE PERFORMANCE METRIC IS BASED ON A WEIGHTED SUMMATION OF CONTRIBUTIONS FROM THE TASKS, AND WHERE A GIVEN WEIGHT ASSOCIATED WITH A GIVEN TASK IS BASED ON A FREQUENCY OF OCCURRENCE OF THE GIVEN TASK
310

PERFORM A REMEDIAL ACTION TO IMPROVE THE DETERMINED PERFORMANCE METRIC DURING A SUBSEQUENT TIME INTERVAL
312

FIG. 3

WEIGHTED PERFORMANCE METRICS FOR FINANCIAL SOFTWARE

BACKGROUND

The present invention relates to techniques for determining performance metrics for financial software and for performing an associated remedial action to address performance problems.

Businesses are increasingly relying on a wide variety of software applications to satisfy their regulatory and operational requirements. As the use of such software applications continues to grow, there is also an increasing need to determine software performance. More specifically, software performance can determine the quality of a user's experience and, thus, how likely the user is to continue using a particular application and/or to buy additional software or associated services.

However, determining software performance can be difficult. One existing technique involves aggregating the times it takes to perform specific tasks in a software product. For example, the time taken to perform a specific task may be compared to a baseline value.

Unfortunately, this technique does not determine an overall performance of the product. For example, the times associated with some tasks may decrease, while the times associated with other tasks may increase. Moreover, these increases or decreases may not be uniform for all the tasks.

Additionally, it may not be possible to solve this problem by simply averaging out the percentage differences (relative to the baseline values) for all of the tasks and using the resulting value as a metric for the overall performance of the product. In particular, percentage differences may not provide an accurate metric for changes in overall performance. For example, the time to perform a first task may increase by 20% from 0.5 s to 0.6 s, and the time to perform a second task may increase by 5.5% from 180 s to 190 s. This example suggests that the changes associated with the first task result in a more significant degradation in overall performance than the changes associated with the second task. However, the change associated with the first task results in a 0.1 s delay (which is unlikely to be noticed by a user), while the change associated with the second task results in a 10 s delay (which is more likely to be noticed by the user).

Moreover, even using absolute time differences may not provide an accurate metric for changes in overall system performance, because not all tasks are equal.

SUMMARY

One embodiment of the present invention provides a computer system that determines a performance metric. During operation, the computer system determines the performance metric for tasks performed by financial software during a time interval. This performance metric is based on a weighted summation of contributions from the tasks, and a given weight associated with a given task is based on a frequency of occurrence of the given task. Then, the computer system performs a remedial action to improve the determined performance metric during a subsequent time interval.

In some embodiments, the given weight is based on an importance of the given task. For example, the importance may be: predetermined by a developer of the financial software; determined based on feedback provided by a user of the financial software; and/or predetermined or preselected by the user of the financial software.

In some embodiments, the given weight is based on an execution time of the given task.

In some embodiments, the computer system compares the determined performance metric to a baseline value (such as a value of the performance metric during one or more preceding time intervals), and the remedial action is performed if a difference between the performance metric and the baseline value exceeds a predetermined threshold.

In some embodiments, the remedial action includes revising a subsequent release of the financial software. Note that the subsequent release may be configured to execute on a client (such as a client computer or a client in a client-server system) and/or on a server in the client-server system.

In some embodiments, the remedial action includes dynamically modifying the financial software. For example, the dynamic modifying may involve selecting a predetermined technique to perform at least a subset of the tasks and/or enabling a subset of modules in the financial software. Moreover, the computer system may rebuild an executable based on the subset of modules.

In some embodiments, the tasks include: saving an invoice, determining a profit/loss report, and/or determining a balance-sheet report.

In some embodiments, the financial software includes: accounting software, payroll software, and/or income-tax software.

Another embodiment provides a method including at least some of the above-described operations.

Another embodiment provides a computer-program product for use in conjunction with the computer system.

BRIEF DESCRIPTION OF THE FIGURES

FIG. 3 is a flowchart illustrating a process for determining a performance metric in accordance with an embodiment of the present invention.

Figure 1:
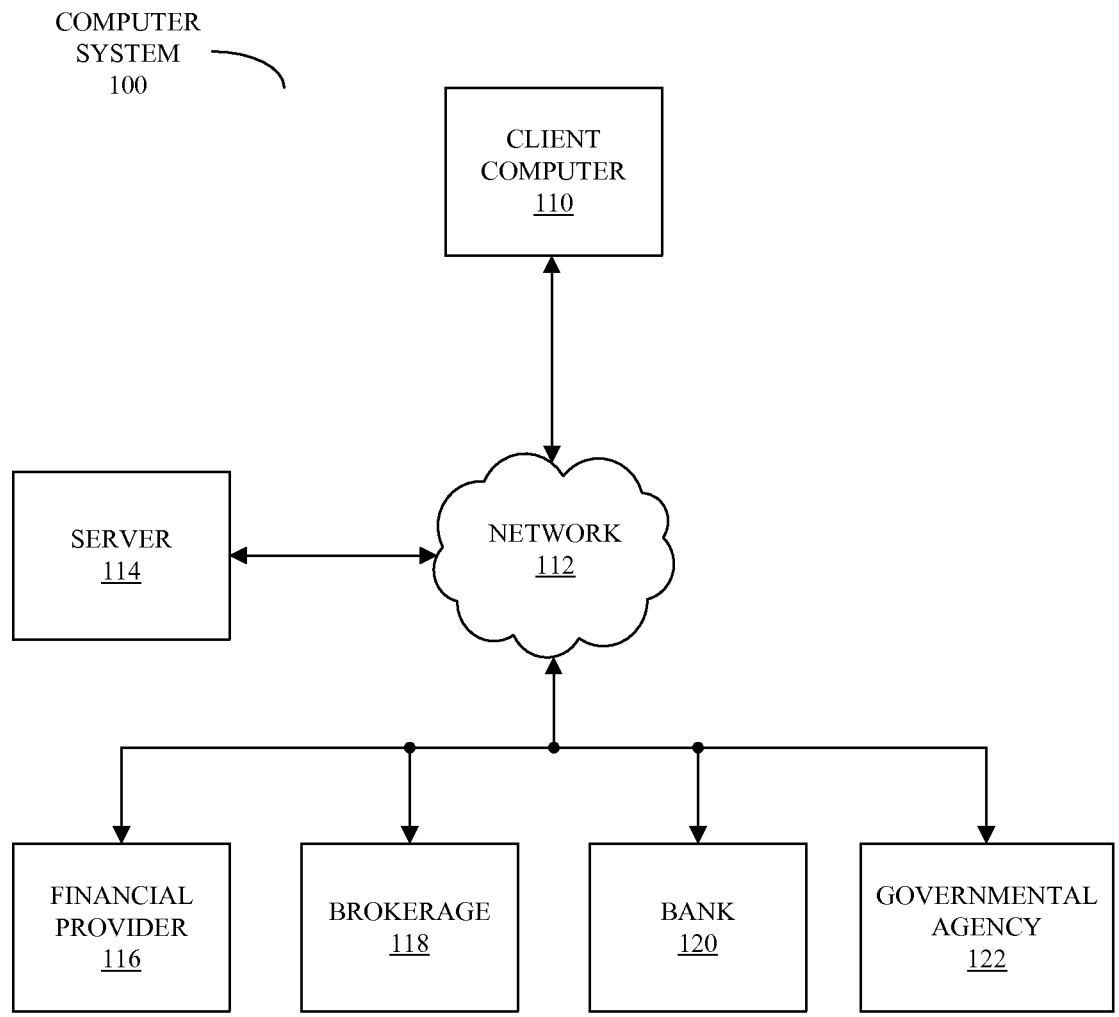
FIG. 1 is a block diagram illustrating a computer system that includes computers and servers that are networked together in accordance with an embodiment of the present invention.

Table 1 provides execution times for tasks in accordance with an embodiment of the present invention.

Table 2 provides determined performance metrics in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer-program product (e.g., software) for use with the computer system that determine a performance metric for financial software are described. This performance metric may be determined for tasks performed by the financial software during a time interval. Note that the performance metric may be based on a weighted summation of contributions from the tasks (such as a weighted summation of execution times associated with the tasks), and a given weight associated with a given task may be based on: a frequency of occurrence of the given task; an importance of the given task; and/or an execution time of the given task.

Moreover, a remedial action may be performed to improve the determined performance metric during a subsequent time interval. For example, a subsequent release of the financial software for the user (or multiple users) may be revised. Alternatively, the remedial action may be performed dynamically, such as during a current user session and/or before a subsequent user session. This remedial action may include selecting a predetermined technique to perform at least a subset of the tasks and/or enabling a subset of modules in the financial software.

In some embodiments, the determined performance metric is compared to a baseline value (such as a value of the performance metric in one or more preceding time intervals), and the remedial action is performed if a difference between the performance metric and the baseline value exceeds a predetermined threshold, such as an increase of 3%.

In general, by using different weights for the tasks, the performance metric can provide a better indication of the overall performance of the financial software. Moreover, by determining the performance metric and performing the remedial action, this technique may allow the financial software (and more generally, a variety of software products) to be modified or adjusted to improve performance and enhance the product experience for individual users and/or groups of users. These improvements may increase customer loyalty and/or sales of other software products developed by the developer of the financial software.

Note that this technique may be implemented as a stand-alone software application, or as a program module or subroutine in another application, such as: accounting software, payroll software, and/or income-tax software. Furthermore, at least a portion of the software application may be configured to execute on a computer, such as: a personal computer, a laptop computer, a server, a work station, a mainframe computer, a cell phone, PDA, or other device capable of manipulating computer-readable data, or between two or more computing systems over a network (such as: the Internet, World Wide Web or WWW, an intranet, LAN, WAN, MAN, or combination of networks, or other technology enabling communication between computing systems). Therefore, information used to determine the performance metric may be stored locally (for example, on a local computer) and/or remotely (for example, on a computer or server that is accessed via a network).

We now describe embodiments of systems, devices and processes for determining a performance metric. FIG. 1 presents a block diagram illustrating a computer system 100, including computers and servers that are networked together. In this computer system, one or more users may use financial software, such as accounting software, payroll software and/or income-tax software, to input or collect information and to perform associated operations and/or calculations. A portion of the financial software, such as one or more data sources and/or computation logic (associated with a particular application that works with the financial software or an application module that is included in an application layer of the financial software), may execute on server 114. When needed, another portion of the financial software, such as a user interface and/or additional computation logic associated with the application, may be provided via network 112 (such as the Internet) to client computer 110.

This portion of the financial software may execute on client computer 110 or in the environment of another application on the client computer 110. For example, the portion of the financial software may be resident on the client computer 110. Alternatively, other embodiments may utilize a financial tool that is embedded in one or more web pages (once again, either as stand-alone software or as a portion of other software). For example, the financial tool may execute in a web browser or in the environment of the web browser.

In an illustrative embodiment, the financial tool is a software package written in: JavaScript™ (e.g., the financial tool includes programs or procedures containing JavaScript instructions), ECMAScript (the specification for which is published by the European Computer Manufacturers Association International), VBScript™ (a trademark of Microsoft, Inc.) or any other client-side scripting language. In other words, the embedded financial tool may include programs or procedures containing: JavaScript™ instructions, ECMAScript instructions, VBScript™ instructions, or instructions in another programming language suitable for rendering by a web browser or another client application on the client computer 110.

In an exemplary embodiment, a user at client computer 110 is using the financial software. In response to a request from the user, such as a request for a form that includes one or more fields (for example, one or more forms containing income-tax or payroll information), one or more web pages may be provided by server 114 to client computer 110.

After receiving the one or more web pages, the user may provide information in the one or more fields in the form. In some embodiments, the user types in the information. However, in some embodiments at least a portion of the information is received from other sources via network 112, such as remotely stored information associated with the user and/or the user's accounts at: financial provider 116, brokerage 118, bank 120, and/or governmental agency 122 (for example, an income-tax agency or an unemployment agency).

Note that information associated with one or more fields in the form may be stored on the client computer 110. Subsequently, this information may be provided to and stored on the server 114 and/or additional remote locations via the network 112. Moreover, the information stored on the server 114 and/or the additional remote locations may be periodically synchronized with the information stored on client computer 110. Because the information associated with the form may be sensitive in nature, in some embodiments such information may be encrypted when it is stored. Additionally, this information may be encrypted when it is communicated over the network 112. For example, the communication process may utilize a protocol such as HyperText Transfer Protocol Secure (HTTPS).

Using the financial software, the user may perform calculations and/or perform operations that are based on the aggregated information. For example, the user may: generate and save invoices; determine a profit and loss report; and/or determine a customer balance-sheet report.

In order to maintain the performance of the financial software (for example, to keep the execution time of the operations and/or calculations from increasing), a developer of the financial software may determine a performance metric for the financial software. Moreover, the performance metric can be used to modify the financial software to improve the quality of a user's experience, and thus, customer retention and/or future sales to the user. (More generally, remedial action can be performed that improves the performance metric during subsequent operation of the financial software.)

These modifications may be performed dynamically (if the financial software is implemented in a client-server system where the financial software is not resident on client computer 110) or after a time interval (such as that associated with a subsequent release of the financial software). For example, features (such as those associated with program modules) in the financial software may be included based on a history of user actions (such as tasks, operations and/or calculations performed by the user) when the code is rebuilt or compiled to create an executable, which may allow the financial software to be streamlined to execute the user's actions more rapidly in the future.

Alternatively and/or additionally, different predetermined techniques may be used to implement tasks based on the performance metric. For example, one technique may save an invoice more rapidly than it performs look-ups (such as those which append the invoice totals to a balance), while another technique may save the invoice less rapidly than it performs look-ups. The appropriate technique for a given user may be selected based on the performance metric.

In general, the performance metric should determine a well-defined overall performance of the financial software, even if there are variations for different operations or tasks that are performed in various workflows. In the following discussion, this problem is solved using a weighted summation to generate the performance metric. In particular, the performance metric may be determined for tasks performed by financial software during a time interval using a weighted summation of contributions from the tasks, such as a weighted summation of execution times of the tasks. Note that the weights for the tasks may be adjusted or selected based on: a frequency of occurrence of the tasks; an importance of the given task; and/or an execution time of the given task.

By using different weights for the tasks, the performance metric may account for the variations in the contributions that the tasks make to the overall performance of the financial software. For example, a task that is performed several times a day may be more significant than another task that is performed once a month. Consequently, the task may have a larger weight, and a relative increase or decrease in the execution time of the task may have a larger impact on the performance metric.

Additionally, the performance metric may account for the different priority or importance of the tasks. For example, the importance may be predetermined by a developer of the financial software and/or may be preselected by the user.

Alternatively and/or additionally, the user may provide feedback (either directly or indirectly, such as based on a user activity history) after using the financial software. For example, if the user works in a call center, looking up an open invoice for a customer who is on the phone may have very high priority, and the user may request that the financial software be tailored based on the user's operational needs.

In some embodiments, relative changes in the overall performance are assessed by comparing the performance metric for the current time interval with a performance metric for one or more preceding time intervals (such as a baseline value). Moreover, if the difference is greater than a predetermined threshold, such as a 3% increase in the performance metric, remedial action may be performed to maintain the overall performance of the financial software.

In some embodiments, the financial software includes software such as: TurboTax™ (from Intuit, Inc., of Mountain View, Calif.), TaxCut™ (from H&R Block, Inc., of Kansas City, Mo.), TaxAct™ (from $2^{nd}$ Story Software, Inc., of Cedar Rapids, Iowa), and/or other software capable of preparing an income-tax return.

Moreover, the financial software may include software such as: QuickBooks™ (from Intuit, Inc., of Mountain View, Calif.), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information. Additionally, in some embodiments the financial software includes software such as: Quicken™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), MINT™ (from Mint.com of Mountain View, Calif.), and/or other planning software capable of processing financial information.

Note that in some embodiments the computer system 100 includes fewer or additional components. Moreover, two or more components may be combined into a single component and/or a position of one or more components may be changed.

Figure 2:
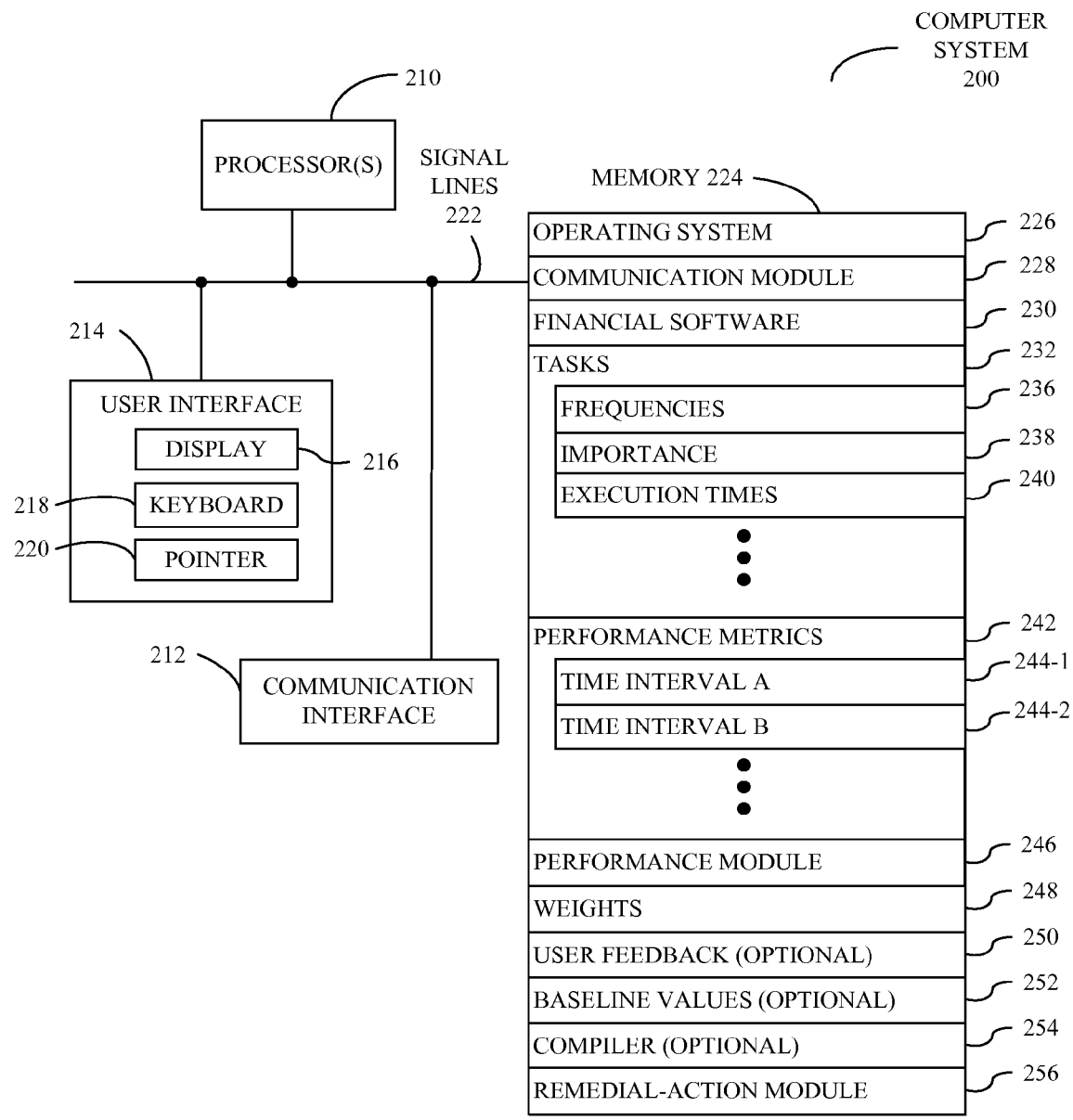
FIG. 2 is a block diagram illustrating a computer system in accordance with an embodiment of the present invention.

FIG. 2 presents a block diagram illustrating a computer system 200. Computer system 200 includes one or more processors 210, a communication interface 212, a user interface 214, and one or more signal lines 222 coupling these components together. Note that the one or more processing units 210 may support parallel processing and/or multithreaded operation, the communication interface 212 may have a persistent communication connection, and the one or more signal lines 222 may constitute a communication bus. Moreover, the user interface 214 may include: a display 216, a keyboard 218, and/or a pointer 220, such as a mouse.

Memory 224 in the computer system 200 may include volatile memory and/or non-volatile memory. More specifically, memory 224 may include: ROM, RAM, EPROM, EEPROM, flash, one or more smart cards, one or more magnetic disc storage devices, and/or one or more optical storage devices. Memory 224 may store an operating system 226 that includes procedures (or a set of instructions) for handling various basic system services for performing hardware-dependent tasks. While not explicitly indicated in the computer system 200, in some embodiments the operating system 226 includes a web browser. Memory 224 may also store procedures (or a set of instructions) in a communication module 228. These communication procedures may be used for communicating with one or more computers and/or servers, including computers and/or servers that are remotely located with respect to the computer system 200.

Memory 224 may also include multiple program modules (or a set of instructions), including financial software 230 (or a set of instructions), performance module 246 (or a set of instructions), optional compiler 254 (or a set of instructions), and/or remedial-action module 256 (or a set of instructions). During operation of the financial software 230 or between uses of the financial software 230, performance module 246 may determine performance metrics 242, such as one or more performance metrics during time interval A 244-1 or time interval B 244-2, using tasks 232 and associated weights 248. Note that tasks 232 may include: saving an invoice, determining a profit/loss report, and/or determining a balance-sheet report.

In some embodiments, the weights 248 are adjusted or selected based on: frequencies 236 of occurrence of the tasks 232; relative importance 238 of the tasks 232; and/or execution times 240 of the tasks 232. Moreover, the relative importance 238 may be predetermined by a developer of the financial software 230 and/or by a user. Alternatively or additionally, the relative importance 238 may be determined based on optional user feedback 250.

Note that in some embodiments one or more of the performance metrics 242 are compared to one or more optional baseline values 252 (such as one or more performance metrics during one or more preceding time intervals). If the difference exceeds a predetermined threshold (such as a difference corresponding to a 3% performance degradation), remedial-action module 256 may modify or adjust the financial software 230. However, in other embodiments the remedial-action module 256 modifies or adjusts the financial software 230 based on one or more performance metrics 242 without performing the comparison to the one or more optional baseline values 252.

Adjusting or modifying the financial software 230 may improve a performance metric during a subsequent time interval. In some embodiments, the adjusting or modifying is performed on a subsequent release of the financial software 230, which may execute on a client computer (such as client computer 110 in FIG. 1) and/or on a server (such as server 114 in FIG. 1). However, in some embodiments the adjusting or modifying is performed dynamically, such as during a current user session. For example, the dynamic adjusting or modifying may involve selecting a predetermined technique to perform at least a subset of the tasks 232 and/or enabling a subset of modules in the financial software 230. Moreover, optional compiler 254 may rebuild an executable based on the subset of modules.

Instructions in the various modules in the memory 224 may be implemented in: a high-level procedural language, an object-oriented programming language, and/or in an assembly or machine language. Note that the programming language may be compiled or interpreted, e.g., configurable or configured, to be executed by the one or more processing units 210.

Although the computer system 200 is illustrated as having a number of discrete items, FIG. 2 is a functional description of the various features that may be present in the computer system 200 rather than a structural schematic of the embodiments described herein. In practice, and as recognized by those of ordinary skill in the art, the functions of the computer system 200 may be distributed over a large number of servers or computers, with various groups of the servers or computers performing particular subsets of the functions. In some embodiments, some or all of the functionality of the computer system 200 may be implemented in one or more application-specific integrated circuits (ASICs) and/or one or more digital signal processors (DSPs).

Computer system 200 may include fewer components or additional components. Moreover, two or more components may be combined into a single component and/or a position of one or more components may be changed. In some embodiments, the functionality of the computer system 200 may be implemented more in hardware and less in software, or less in hardware and more in software, as is known in the art.

We now discuss methods for determining a performance metric. FIG. 3 presents a flowchart illustrating a process 300 for determining a performance metric, which may be performed by a computer system. During operation, the computer system determines the performance metric for tasks performed by financial software during a time interval (310). This performance metric is based on a weighted summation of contributions from the tasks, and a given weight associated with a given task is based on a frequency of occurrence of the given task. Then, the computer system performs a remedial action to improve the determined performance metric during a subsequent time interval (312).

In some embodiments of process 300, there may be additional or fewer operations. For example, the computer system may compare the determined performance metric to a baseline value, and the remedial action may be performed if a difference between the performance metric and the baseline value exceeds a predetermined threshold. Moreover, the order of the operations may be changed and/or two or more operations may be combined into a single operation.

We now describe examples of determining the performance metric and/or performing remedial action. Table 1 presents execution times for tasks performed by financial software.

TABLE 1

|  | Baseline | Current Time Interval | Increase (%) | Difference (s) |
|---|---|---|---|---|
| Task 1 | 246.289 | 260.120 | 5.616 | 13.831 |
| Task 2 | 2.290 | 1.860 | −18.802 | −0.430 |
| Task 3 | 6.228 | 10.922 | 75.369 | 4.694 |
| Task 4 | 5.422 | 10.582 | 95.160 | 5.160 |
| Task 5 | 67.666 | 74.891 | 10.677 | 7.225 |
| Task 6 | 90.695 | 122.109 | 34.637 | 31.414 |
| Task 7 | 35.204 | 47.914 | 36.102 | 12.710 |

In some embodiments, the performance metric is determined using a weighted summation of absolute execution times of the tasks, where the weights are based on the frequency of occurrence of the tasks and the importance of the tasks. For example, the weights may be selected based on frequencies of occurrence between 1 and 5 (from infrequent to frequent) and importance values between 1 and 5 (from low to high importance). Table 2 presents determined performance metrics for the tasks.

TABLE 2

|  | Baseline | Current Time Interval | Increase (%) | Difference (s) | Frequency | Weighted Average |
|---|---|---|---|---|---|---|
| Task 1 | 246.289 | 260.120 | 5.616% | 13.831 | 4 | 0.225 |
| Task 2 | 2.290 | 1.860 | −18.802% | −0.431 | 5 | −0.940 |
| Task 3 | 6.228 | 8.345 | 33.992% | 2.117 | 2 | 0.680 |

TABLE 2-continued

|        | Baseline | Current Time Interval | Increase (%) | Difference (s) | Frequency | Weighted Average |
|--------|----------|----------------------|--------------|----------------|-----------|------------------|
| Task 4 | 5.422    | 6.011                | 10.863%      | 0.589          | 1         | 0.109            |
| Task 5 | 67.666   | 74.891               | 10.677%      | 7.225          | 4         | 0.427            |
| Task 6 | 90.695   | 122.109              | 34.637%      | 31.414         | 1         | 0.346            |
| Task 7 | 35.204   | 47.390               | 34.615%      | 12.186         | 5         | 1.731            |
|        |          | Total Performance Metric |          |                |           | 2.578            |

Note that while task 6 and task 7 each degrade by approximately the same percentage (nearly 35%), task 7 is more frequent than task 6 and it makes a larger contribution to the performance metric. Therefore, the total performance metric may provide a better indication of the overall performance of the financial software based on how it is used by customers.

Figure 4:
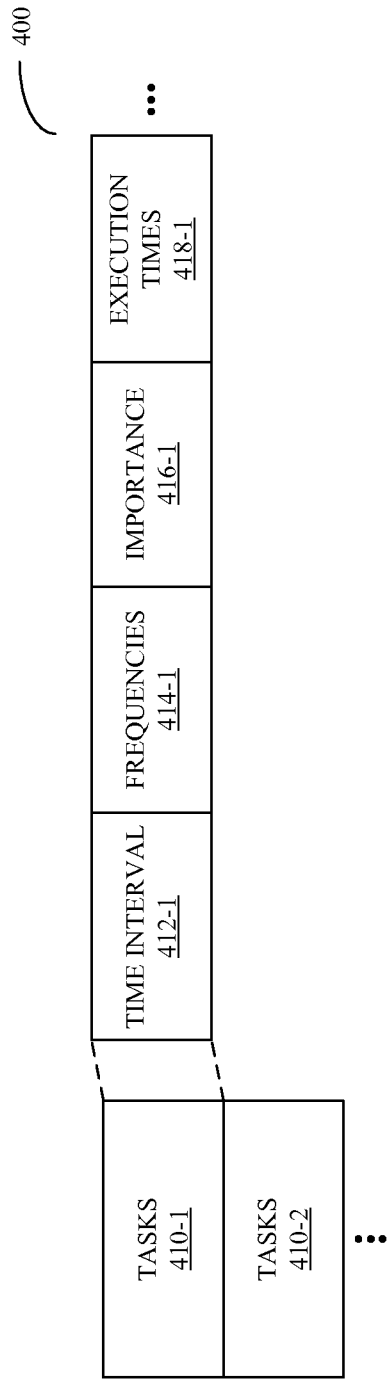
FIG. 4 is a block diagram illustrating a data structure in accordance with an embodiment of the present invention.

We now discuss data structures that may be used in the computer system 100 (FIG. 1) and/or 200 (FIG. 2). FIG. 4 presents a block diagram illustrating a data structure 400. This data structure may include tasks 410. For example, entries for tasks 410-1 may include: a time interval 412-1, frequencies 414-1 of occurrence of the tasks 410-1, (relative) importance 416-1 of the tasks 410-1, and/or execution times 418-1 of the tasks 410-1.

Figure 5:
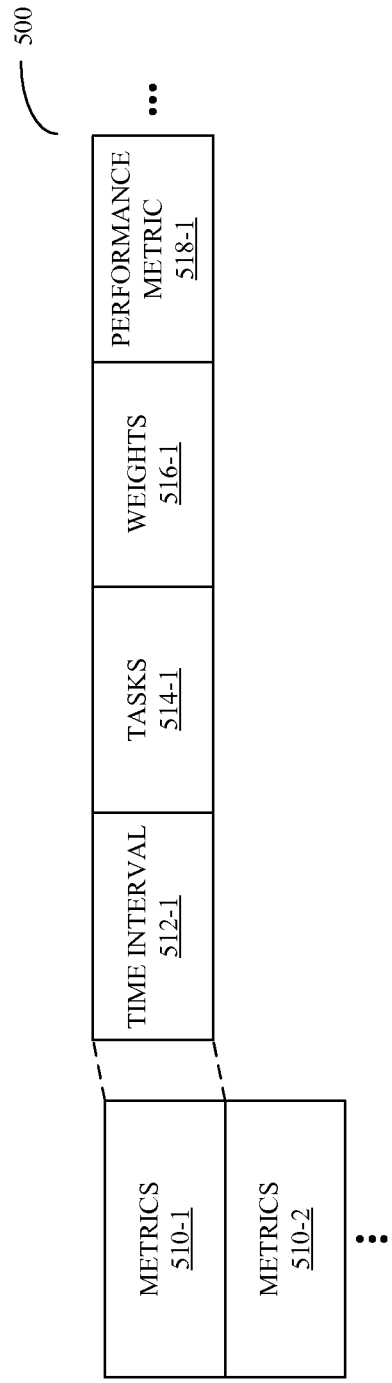
FIG. 5 is a block diagram illustrating a data structure in accordance with an embodiment of the present invention.

FIG. 5 presents a block diagram illustrating a data structure 500. This data structure may include metrics 510. For example, entries for metrics 510-1 may include: a time interval 512-1, tasks 514-1, associated weights 516-1, and/or performance metric 518-1.

Note that that in some embodiments of the data structures 400 (FIG. 4) and/or 500 there may be fewer or additional components. Moreover, two or more components may be combined into a single component and/or a position of one or more components may be changed.

While the preceding embodiments have used determination of performance metrics and/or performance of remedial action for financial software as an illustrative embodiment, these techniques may be used to determine performance metrics and/or to perform remedial action for a wide variety of software in addition to financial software.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for modifying a financial software, comprising:
   executing a first executable of the financial software during a user session, wherein the first executable includes a first set of modules which perform a set of tasks for a user;
   determining an execution time of each of the set of tasks performed by each of the corresponding first set of modules during a time interval;
   selecting weights for each task in the set of tasks, wherein the selected weights for each task are based partially on the user's activity history with respect to the task during previous user sessions, and partially on the relative importance of the task as predetermined by a developer;
   determining a performance metric as a weighted summation of the execution times of each of the set of tasks based on the selected weights;
   in response to detecting that the performance metric has degraded more than the predetermined threshold,
      dynamically selecting, during the user session, a second set of modules which perform the set of tasks, wherein the second set of modules is different from the first set of modules, wherein said selecting is based on the performance metric that was determined, and wherein the second set of modules improves the performance metric when the performance metric is determined subsequently;
      generating a second executable of the financial software based on the second set of modules during the user session; and
      executing the second executable during the user session.

2. The method of claim 1, wherein the weights are determined based on feedback provided by a user of the financial software.

3. The method of claim 1, wherein the weights are predetermined by a user of the financial software.

4. The method of claim 1, wherein the weights are based on execution times of the set of tasks.

5. The method of claim 1, wherein the second compiled executable is configured to execute on a client.

6. The method of claim 1, wherein the second compiled executable is configured to execute on a server in a client-server system.

7. The method of claim 1, wherein the tasks include saving an invoice, determining a profit/loss report, or determining a balance-sheet report.

8. A computer-program product for use in conjunction with a computer system, the computer-program product comprising a non-transitory computer-readable storage medium and a computer-program mechanism embedded therein for configuring the computer system, the computer-program mechanism including:
   instructions for executing a first executable of the financial software during a user session, wherein the first executable includes a first set of modules which perform a set of tasks for a user;
   instructions for determining an execution time of each of the set of tasks performed by each of the corresponding first set of modules during a time interval;
   instructions for selecting weights for each task in the set of tasks, wherein the selected weights for each task are based partially on the user's activity history with respect to the task during previous user sessions, and partially on the relative importance of the task as predetermined by a developer;
   instructions for determining a performance metric as a weighted summation of the execution times of each of the set of tasks based on the selected weights;

instructions for detecting if the performance metric has degraded more than a predetermined threshold; and instructions for, in response to detecting that the performance metric has degraded more than a predetermined threshold, dynamically selecting, during the user session, a second set of modules which perform the set of tasks, wherein the second set of modules is different from the first set of modules, wherein said selecting is based on the performance metric that was determined, and wherein the second set of modules improves the performance metric when the performance metric is determined subsequently;

generating a second executable of the financial software based on the second set of modules during the user session; and executing the second executable during the user session.

9. The computer-program product of claim 8, wherein the weights are determined based on feedback provided by a user of the financial software.

10. The computer-program product of claim 8, wherein the weights are based on execution times of the set of tasks.

11. The computer-program product of claim 8, wherein the tasks include saving an invoice, determining a profit/loss report, or determining a balance-sheet report.

12. A computer system, comprising:

a processor; and a non-transitory computer-readable storage medium storing instructions, comprising:

instructions for executing a first executable of the financial software during a user session, wherein the first executable includes a first set of modules which perform a set of tasks for a user;

instructions for determining an execution time of each of the set of tasks performed by each of the corresponding first set of modules during a time interval;

instructions for selecting weights for each task in the set of tasks, wherein the selected weights for each task are based partially on a user's activity history with respect to the task during previous user sessions, and partially on the relative importance of the task as predetermined by a developer;

instructions for determining the performance metric as a weighted summation of the execution times of each of the set of tasks based on the selected weights;

instructions for detecting if the performance metric has degraded more than a predetermined threshold; and instructions for, in response to detecting that the performance metric has degraded more than the predetermined threshold, dynamically selecting, during the user session, a second set of modules which perform the set of tasks, wherein the second set of modules is different from the first set of modules, wherein said selecting is based on the performance metric that was determined, and wherein the second set of modules improves the performance metric when the performance metric is determined subsequently;

generating a second executable of the financial software based on the second set of modules during the user session; and executing the second executable during the user session.

* * * * *